United States Patent Office 3,567,740
Patented Mar. 2, 1971

3,567,740
CYCLOPROPANECARBOXYLIC ACID ESTERS
Masanao Matsui, Tokyo, Kenzo Ueda, Saitama-ken, Toshio Mizutani, Ikeda-shi, Nobushige Itaya and Shigeyoshi Kitamura, Minoo-shi, Akira Fujinami, Takarazuka-shi, Keimei Fujimoto, Kyoto, and Yositosi Okuno, Nishinomiya-shi, Japan, assignors to Sumitomo Chemical Company, Ltd., Osaka, Japan
No Drawing. Filed Aug. 21, 1967, Ser. No. 661,799
Claims priority, application Japan, Aug. 24, 1966, 41/55,974, 41/55,975
Int. Cl. A01n 9/24; C07c 69/74; C07d 63/10
U.S. Cl. 260—347.4
14 Claims

ABSTRACT OF THE DISCLOSURE

New cyclopropanecarboxylates are prepared by reacting cyclopropanecarboxylic acid or acid halide or anhydride thereof with a primary alcohol.

---

The new cyclopropanecarboxylates may be prepared as well by reacting an inorganic salt or tertiary organic base salt of cyclopropanecarboxylic acid with a halide.

Cyclopropanecarboxylate formulations in accordance with the present invention have strong insecticidal effects and are used, either independently or in admixture of 2 or more, as insecticidal compositions in combination with common diluents and other insecticides, agricultural chemicals, fungicides, herbicides or fertilizers.

This invention relates to new cyclopropanecarboxylic acid esters and process for producing the same and to insecticides containing the same as active ingredients.

More particularly, the invention pertains to new cyclopropanecarboxylates represented by the formula,

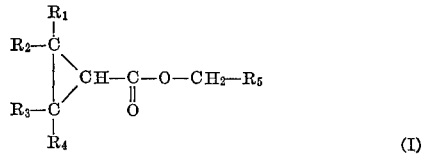

(I)

wherein $R_1$ is a hydrogen atom, lower alkyl group or phenyl group, said phenyl group may have been substituted by a lower alkyl group or alkoxy group; $R_2$, $R_3$ and $R_4$ are individually a lower alkyl group; $R_5$ is a phenyl, furyl or benzofuryl group, said phenyl and furyl groups may have individually been substituted by a lower alkyl group, halogen atom, alkenyl group, alkylene group, benzyl group, lower alkyl-substituted benzyl group, thenyl group or furfuryl group, and said benzofuryl group may have been substituted by a lower alkyl group.

As 3-member cyclic compounds showing insecticidal activity, there have, been esters of chrysanthemum-monocarboxylic acid and pyrethric acid (the two will be generically termed as "chrysanthemumic acid," hereinafter), and these are extensively used as the so-called "pyrethroides." The characteristics of said pyrethroides are that, in general, they are low in toxicity to warm blooded animals and are quick acting. As a condition for said esters of chrysanthemumic acid to display their insecticidal activity the presence of isobutenyl groups in the structure of chrysanthemumic acid has been considered essential. As the result of studies on chrysanthmumic acid, however, the present inventors have come to known that esters of substituted cyclopropanecarboxylic acid represented by the general Formula II) shown below are also effective and the presence of isobutenyl groups is not always necessary.

As would be understood from the fact that all of the insecticides actually used at present are esters of chrysanthemumic acid, it is not too much to say that there are little useful cyclopropanecarboxylic acids which are analoguous to chrysanthemumic acid. It has now been found, however, that the cyclopropanecarboxylates prepared in accordance with the present process are novel esters which are entirely different in structure from conventional esters and are markedly excellent in insecticidal activity.

Chrysanthemumate-type insecticides are not only prominent in insecticidal activity but also are excellent in that they are less toxic to men and animals, are quick acting on injurious insects and scarcely make such insects chemical resistant. On the other hand, however, said insecticides have such drawbacks that they are expensive and they are difficultly said to be particularly excellent in residual effects.

An object of the present invention is to provide at low costs insecticides far more excellent than the conventional chrysanthemumates which are free from the above drawbacks.

The cyclopropanecarboxylic acid esters of the present invention are prepared by esterifying cyclopropanecarboxylic acids represented by the general formula,

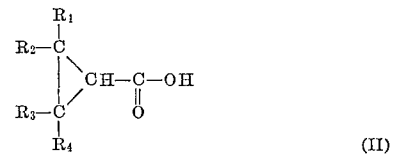

(II)

wherein $R_1$, $R_2$, $R_3$ and $R_4$ have the same significances as mentioned above, with alcohols represented by the formula,

$$R_5—CH_2—OH \qquad (III)$$

wherein $R_5$ has the same significance as mentioned above.

These compounds have insecticidal activity on agriculturally injurious insects such as green rice leaf-hopper, small brown plant hopper in addition to houseflies, mosquitoes and cockroaches, and are valuable as insecticides not only for epidemic prevention but also for agriculture and horticulture. The fact that the present compounds represented by the aforesaid general Formula I are not only novel compounds but also are prominent in insecticidal activity and are widely usable for epidemic prevention, agriculture and horticulture is a knowledge first attained by the present inventors.

Certain alcohols in the present compounds are known to form esters with chrysanthemumic acid and exhibit insecticidal activity as chrysanthemumates. However, esters of such alcohols with the present cyclopropanecarboxylic acids are more excellent in insecticidal activity than esters with chrysanthemumic acid, in most cases. This is an interesting fact and, at the same time, makes the present invention further significant.

As also mentioned previously, the present compounds have prominent insecticidal effects on sanitary injurious insects such as flies, mosquitoes and cockroaches and are non-toxic to men and animals. By virtue of such characteristics, the present insecticidal compositions not only find a wide scope of uses particularly for epidemic prevention but also are useful for the prevention and extermination of insects injurious to stored cereals, agriculture and forest. Particularly, due to their low toxicity, the present insecticidal compositions are markedly useful in that they are freely applicable to crops before harvest, home horticulture, glass culture and food-packing materials.

The process of the present invention will be explained below.

The first feature is a process for preparing cyclopropanecarboxylates represented by the aforesaid general Formula I, comprising reacting in the presence of a dehydrogen halide agent an alcohol represented by the general formula, $$R_5—CH_2—OH \quad (III)$$

wherein $R_5$ has the same significance as mentioned before, with a cyclopropanecarboxylic acid halide represented by the formula,

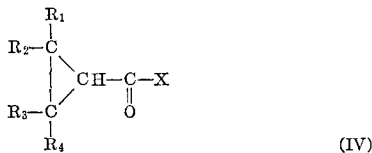

(IV)

wherein $R_1$, $R_2$, $R_3$ and $R_4$ have the same significances as mentioned before; and X is a halogen atom. The acid halide represented by the general Formula IV is readily prepared by reacting a corresponding acid of the Formula II with a halide such as thionyl chloride, phosgene or phosphorus halide. In practicing the reaction of the above process, the reaction temperature is desirably room temperature or below, and no particular advantage is brought about even when the reaction is effected at an elevated temperature. In the present process, the use of an inert solvent is not indispensable but is desirable in order to progress the reaction smoothly. As the dehydrogen halide agent, a tertiary organic base is desirable, but a carbonate of an alkali metal or alkaline earth metal may also be used.

The second feature of the present process is a process for preparing cyclopropanecarboxylates represented by the aforesaid general Formula I, comprising reacting a halide compound represented by the formula, $$R_5—CH_2—X \quad (V)$$

wherein $R_5$ has the same significance as mentioned before; and X is a halogen atom, with an inorganic salt or tertiary organic base salt of a carboxylic acid represented by the formula,

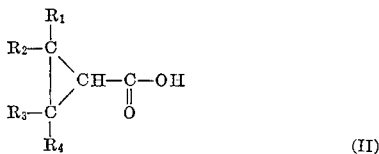

(II)

wherein $R_1$, $R_2$, $R_3$ and $R_4$ have the same significances as mentioned before.

In practicing the above process, the use of a solvent is not indispensable, but an inert solvent such as acetone or methylisobutylketone may be used. Further, the above reaction is advantageously effected at an elevated temperature.

The third feature of the present process is a process for preparing cyclopropanecarboxylates represented by the aforesaid Formula I, comprising reacting an alcohol represented by the above-mentioned general Formula III with an anhydride of a carboxylic acid represented by the above-mentioned Formula II, having the formula,

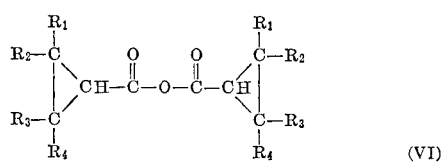

(VI)

wherein $R_1$, $R_2$, $R_3$ and $R_4$ have the same meanings as identified above. In this case, the reaction is advantageously effected in an inert solvent such as toluene or xylene with reflux at an elevated temperature, but the reaction progresses at room temperature, as well. The acid anhydride employed in the above process is easily obtainable by refluxing at an elevated temperature a corresponding carboxylic acid represented by the above-mentioned general Formula II with acetyl chloride. Further, an acid recovered in the esterification reaction is again formed into an acid anhydride and is repeatedly used.

The fourth feature of the present invention is a process for preparing cyclopropanecarboxylates represented by the general Formula I, comprising reacting in the presence of a dehydrating agent, such as dicyclohexylcarbodiimide, an alcohol represented by the aforesaid general Formula III with a carboxylic acid represented by the aforesaid general Formula II. In this case, the reaction proceeds smoothly at room temperature, preferably in an inert solvent such as benzene, toluene or methylene chloride.

Typical examples of the alcohols represented by the general Formula III which are employed in the present invention include 2,4-dimethylbenzyl alcohol,
3,4-dimethylbenzyl alcohol,
2,4,6-trimethylbenzyl alcohol,
pentamethylbenzyl alcohol,
3,4-trimethylenebenzyl alcohol,
3,4-tetramethylenebenzyl alcohol,
2-methyl-4,5-tetramethylenebenzyl alcohol,
2-methyl-4,5-trimethylenebenzyl alcohol,
4-allylbenzyl alcohol,
2-methyl-4-allylbenzyl alcohol,
2,6-dimethyl-4-allylbenzyl alcohol,
2,3,5,6-tetramethyl-4-allylbenzyl alcohol,
4-crotylbenzyl alcohol,
4-(2'-methallyl)-benzyl alcohol,
2,6-dimethyl-4-(2'-methallyl)-benzyl alcohol,
4-benzylbenzyl alcohol,
4-(3'-methylbenzyl)-benzyl alcohol,
4-(4'-methylbenzyl)-benzyl alcohol,
4-(2'-methylbenzyl)-benzyl alcohol,
4-(2',4'-dimethylbenzyl)-benzyl alcohol,
4-(2',4',6'-trimethylbenzyl)-benzyl alcohol,
4-(2'-furfuryl)-benzyl alcohol,
4-(2'-thenyl)-benzyl alcohol,
2,6-dichlorobenzyl alcohol,
2,3,6-trichlorobenzyl alcohol,
2,3,5,6-tetrachlorobenzyl alcohol,
pentachlorobenzyl alcohol,
2-benzyl-4-furfuryl alcohol,
2-(2',4'-dimethylbenzyl)-4-furfuryl alcohol,
2-benzyl,5-furfuryl alcohol,
4-benzyl-5-methyl-2-furfuryl alcohol,
5-benzyl-2-methyl-3-furfuryl alcohol,
2-(4'-methylbenzyl)-5-furfuryl alcohol,
3-methyl-2-furfuryl alcohol,
2-methyl-3-furfuryl alcohol,
5-methyl-2-furfuryl alcohol,
2,5-dimethyl-3-furfuryl alcohol,
5-allyl-2-furfuryl alcohol,
5-allyl-3-furfuryl alcohol,
5-furfuryl-2-furfuryl alcohol,
5-furfuryl-3-furfuryl alcohol,
2-methyl-4,5-tetramethylene-3-furfuryl alcohol,
3-methyl-4,5-benzo-2-furfuryl alcohol,
4,5-benzo-2-furfuryl alcohol, and
4,5-benzo-3-furfuryl alcohol.

Further, examples of the cyclopropanecarboxylic acid represented by the Formula II are 2,3,3-trimethylcyclopropane-1-carboxylic acid,
2,2,3,3-tetramethylcyclopropane-1-carboxylic acid,
2,3,3-trimethyl-2-ethylcyclopropane-1-carboxylic acid,
2,3,3-trimethyl-2-propylcyclopropane-1-carboxylic acid,
2,3,3-trimethyl-2-phenylcyclopropane-1-carboxylic acid,
2,3,3-trimethyl-2-(4'-methylphenyl)-cyclopropane-1-carboxylic acid,
2,3,3-trimethyl-2-(4'-methoxyphenyl)-cyclopropane-1-carboxylic acid,
2,3,3-trimethyl-2-(2',4'-dimethylphenyl)-cyclopropane-1-carboxylic acid,
2,2-dimethyl-3,3-diethylcyclopropane-1-carboxylic acid, 2,2-dimethyl-3-ethyl-3-phenylcyclopropane-1-carboxylic acid,
2,2,3-trimethylcyclopropanecarboxylic acid,
2,2,3,3-tetramethylcyclopropanecarboxylic acid,
2,2,3-trimethyl-3-ethylcyclopropanecarboxylic acid,
2,2-dimethyl-3,3-diethylcyclopropanecarboxylic acid,
2,2,3,3-tetraethylcyclopropanecarboxylic acid,
2,2,3-trimethyl-3-phenylcyclopropanecarboxylic acid,
2,2-dimethyl-3-ethyl-3-phenylcyclopropanecarboxylic acid,
2,2,3-trimethyl-3-(p-tolyl)-cyclopropanecarboxylic acid and
2,2,3-trimethyl-3-(p-anisyl)-cyclopropanecarboxylic acid.

There are various stereoisomers of the new cyclopropanecarboxylates obtained in accordance with the present process. It is, however, needless to say that all the stereoisomers having plane structures represented by the aforesaid general Formula I are involved in the scope of the present invention.

Typical examples of the present compounds include the following compounds:

(1)

2,4-dimethylbenzyl 2,2,3,3-tetramethylcyclopropane-1-carboxylate (2)

3,4-tetramethylenebenzyl 2,2,3,3-tetramethylcyclopropane-1-carboxylate (3)

4-benzylbenzyl 2,2,3,3-tetramethylcyclopropane-1-carboxylate (4)

2,3,6-trichlorobenzyl 2,2,3,3-tetramethylcyclopropane-1-carboxylate (5)

5-benzyl-3-furylmethyl 2,2,3,3-tetramethylcyclopropane-1-carboxylate (6)

4,5-benzo 2-furfuryl 2,2,3,3-tetramethylcyclopropane-1-carboxylate (7) 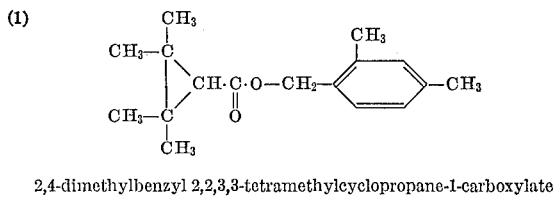

4-allylbenzyl 2,2,3,3-tetramethylcyclopropane-1-carboxylate (8) 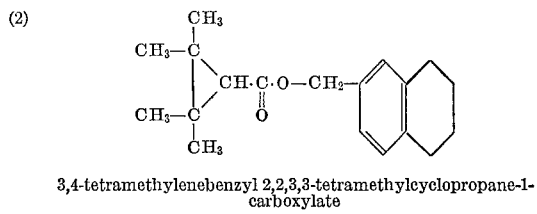

4-(4'-methylbenzyl)-benzyl 2,2,3,3-tetramethylcyclopropane-1-carboxylate (9) 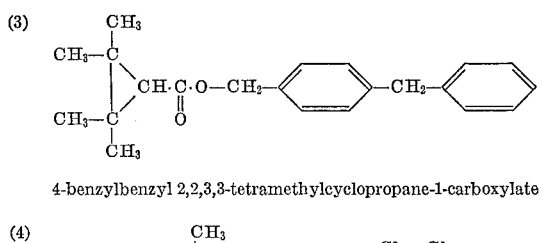

2,6-dimethyl-4-allylbenzyl 2,2,3,3-tetramethyl-cyclopropane-1-carboxylate

(10) 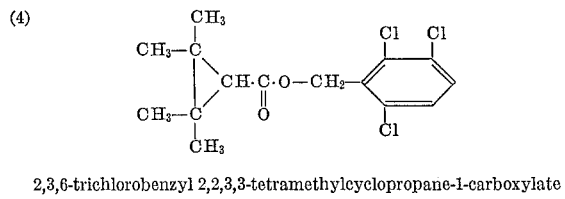

4-(2'-methallyl)-benzyl 2,2,3,3-tetramethyl-cyclopropane-1-carboxylate

(11) 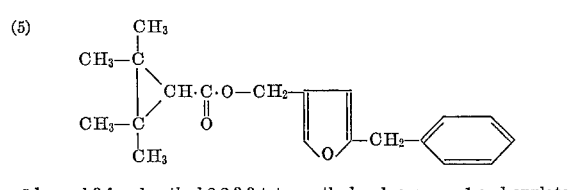

2,5-dimethyl-4-allylbenzyl 2,2,3,3-tetramethyl-cyclopropane-1-carboxylate

(12) 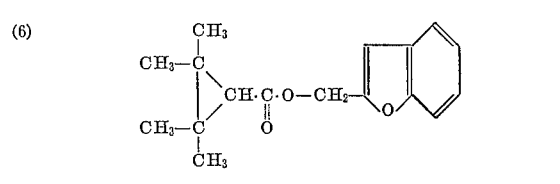

3-methyl-2-furfuryl 2,2,3,3-tetramethyl-cyclopropane-1-carboxylate (13)

2-methyl-4-benzyl-3-furylmethyl 2,2,3,3-tetramethylcyclopropane-1-carboxylate (14)

4-allylbenzyl 2,3,3-trimethyl-2-phenylcyclopropane-1-carboxylate (15)

3,4-tetramethylenebenzyl 2,3,3-trimethyl-2-phenylcyclopropane-1-carboxylate

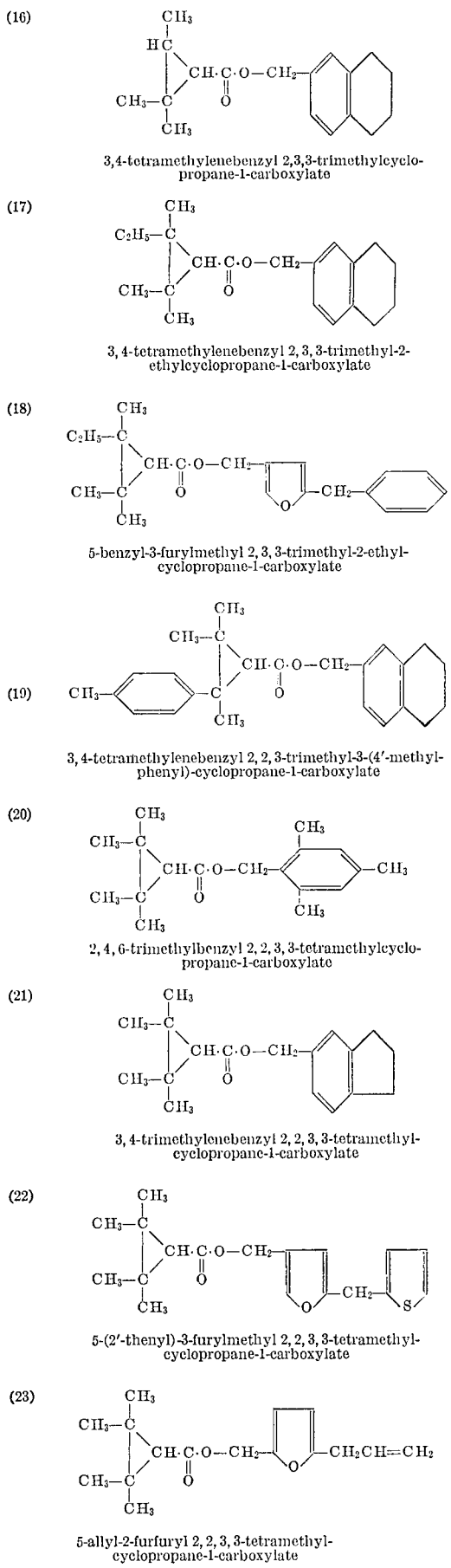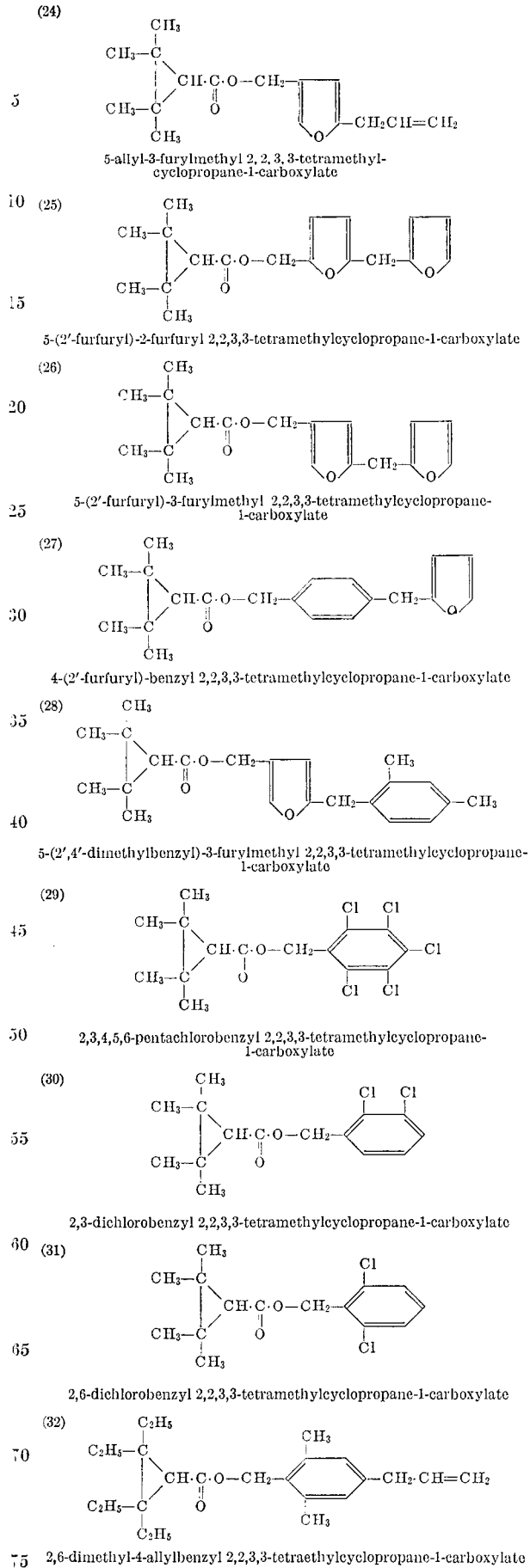

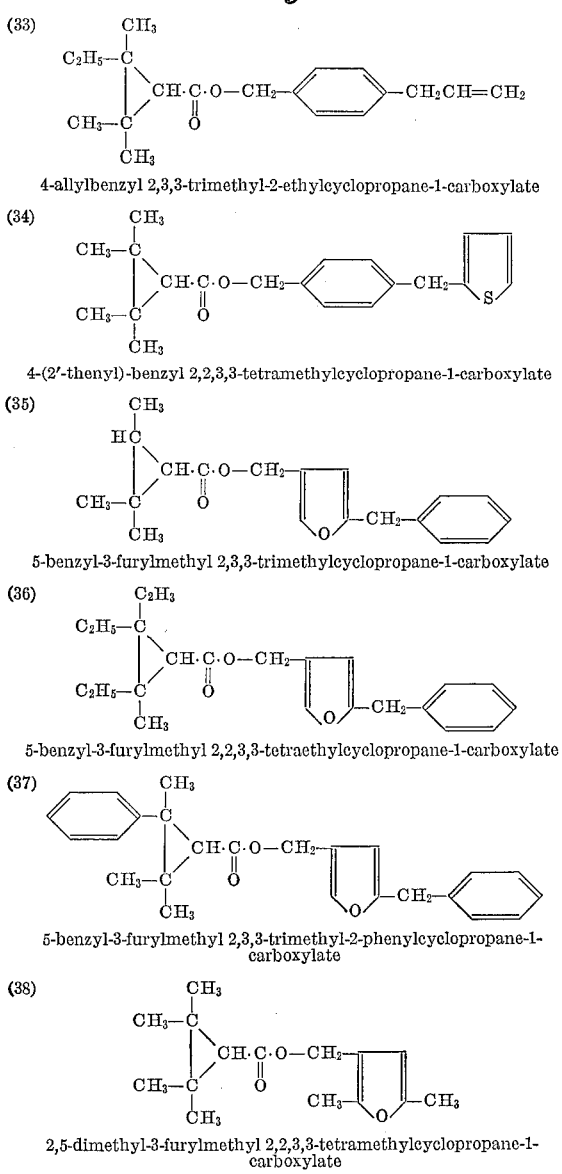

(33) 4-allylbenzyl 2,3,3-trimethyl-2-ethylcyclopropane-1-carboxylate

(34) 4-(2'-thenyl)-benzyl 2,2,3,3-tetramethylcyclopropane-1-carboxylate

(35) 5-benzyl-3-furylmethyl 2,3,3-trimethylcyclopropane-1-carboxylate

(36) 5-benzyl-3-furylmethyl 2,2,3,3-tetraethylcyclopropane-1-carboxylate

(37) 5-benzyl-3-furylmethyl 2,3,3-trimethyl-2-phenylcyclopropane-1-carboxylate

(38) 2,5-dimethyl-3-furylmethyl 2,2,3,3-tetramethylcyclopropane-1-carboxylate

In preparing insecticidal compositions containing the present compounds as active ingredients, common diluents for insecticides are used, like in the case of conventional pyrethroides, and the compositions may be formed, according to methods thoroughly known to those skilled in the art, into any of oil formulations, emulsions, dust preparation, aerosols, wettable powder, granules mosquito coils and other fumigant formulations. In addition thereto, they may be formed into death-inducing dust or solid formulations incorporated with baits or the like materials attracive for injurious insects. The thus prepared formulations can exhibit their insecticidal effects when used in exactly the same manner as in the case of pyrethroides.

The present compounds may also be used in combination of 2 or more, and the insecticides prepared in accordance with the present invention can be enhanced in insecticidal effects when used in admixture with a synergist for pyrethroides such as α-[2-(2-butoxyethoxy)-ethoxy]-4,5-methylenedioxy-2-propyltoluene (hereinafter referred to as "piperonyl butoxide") or 1,2-methylenedioxy - 4 - [2 - (octylsulfinyl)propyl]-benzene (hereinafter referred to as "sulfoxide"). Further, in forming the present compounds into mosquito coils, the insecticidal effects can be increased by incorporating therein 3,4-methylenedioxybenzoic acid, 2,6-di-tertiary butyl-4-methylphenol, benzene-para-dicarboxylic acid, benzene-meta-dicarboxylic acid, para-tertiary butyl benzoic acid, 1-methyl-2-carboxy-4-isopropylcyclohexanone - (3), 3-methoxy-4-hydroxybenzoic acid or 2-isopropyl-4-acetylvaleric acid. It is also possible to obtain multipurpose compositions by incorporation of other active ingredients, e.g. pyrethroide-type insecticides; organic phosphorus-type insecticides such as O,O - dimethyl-O-(3-methyl-4-nitrophenyl) thiophosphate (hereinafter referred to as "Sumithion," a registered trademark), O,O,-dimethyl-O-(4-methylthio-m-tolyl) thiophosphate (hereinafter referred to as "Baytex," a registered trademark), O,O - dimethyl - 2,2 - dichlorovinylphosphate (hereinafter referred to as DDVP) or O,O-diethyl-O-(2-isopropyl-4-methyl-6-pyrimidyl) phosphorothioate (hereinafter referred to as "Diazinon," a registered trademark); organic chlorine-type insecticides such as 1,1,1-trichloro-2,2-bis(p-chlorophenyl) ethane (hereinafter referred to as "DDT") or 1,2,3,4,5,6-hexachlorocyclohexane (hereinafter referred to as "BHC") or the like insecticides, sterilizers, miticides, fungicides, herbicides, fertilizers and the like agricultural chemicals.

The following examples illustrate the present process. But it is not intended to limit the invention to the examples.

EXAMPLE 1

2.3 g. of 2,4-dimethylbenzyl chloride and 2.2 g. of 2,2,3,3-tetramethylcyclopropane-1-carboxylic acid were dissolved in 20 cc. of methylisobutylketone. The solution was charged with 2 g. of triethylamine and was heated and refluxed for 15 hours. After cooling, the reaction liquid was washed successively with 5% hydrochloric acid, 5% aqueous sodium carbonate solution and saturated sodium chloride water, and was then dried with anhydrous magnesium sulfate. Thereafter, the solvent was removed by reduced pressure distillation, and the residue was purified according to column chromatography using alumina to obtain 3.2 g. of pale yellow, viscous, oily 2,4-dimethylbenzyl 2,2,3,3 - tetramethylcyclopropane - 1 - carboxylate, $n_D^{31}$ 1.5056.

Elementary analysis.—Calculated for $C_{17}H_{24}O_2$ (percent): C, 78.4; H, 9.3. Found (percent): C, 78.4; H, 9.1.

EXAMPLE 2

1.6 g. of 3,4-tetramethylenebenzyl alcohol and 2 cc. of pyridine were dissolved in 30 cc. of dry benzene, and the solution was cooled with ice. This solution was charged with a solution of 1.8 g. of 2,2,3,3-tetramethylcyclopropane-1-carboxylic acid chloride in 5 cc. of benzene. The mixed liquid was thoroughly shaken was sealed in a container and was allowed to stand overnight at room temperature. This reaction liquid was washed successively with 5% hydrochloric acid, 5% aqueous sodium carbonate solution and saturated sodium chloride water. Thereafter, the liquid was dried with anhydrous magnesium sulfate, and the solvent was removed by distillation. The residue was purified according to column chromatography using active alumina to obtain 2.6 g. of viscous oily 3,4-tetramethylenebenzyl 2,2,3,3-tetramethylcyclopropanecarboxylate, $n_D^{31}$ 1.5210.

Elementary analysis.—Calculated for $C_{19}H_{25}O_2$ (percent): C, 79.7; H, 9.2. Found (percent): C, 79.6; H, 9.3.

EXAMPLE 3

2.0 g. of 4-benzylbenzyl alcohol and 2 cc. of pyridine were dissolved in 30 cc. of dry benzene, and the solution was cooled with ice. This solution was charged with a solution of 1.8 g. of 2,2,3,3-tetramethylcyclopropanecarboxylic acid chloride in 5 cc. of benzene. The mixed liquid was thoroughly shaken, was sealed as such in a container and was allowed to stand overnight at room temperature. The reaction liquid was washed successively with 5% hydrochloric acid, 5% aqueous sodium carbonate solution and saturated sodium chloride water. Thereafter, the liquid was dried with anhydrous magnesium sulfate and then the solvent was removed by distillation. The residue was purified according to column chromatography using silica gel to obtain 3.2 g. of 4-benzylbenzyl 2,2,3,3-tetramethylcyclopropane-1-carboxylate, $n_D^{31}$ 1.5395.

Elementary analysis.—Calculated for $C_{22}H_{26}O_2$ (percent): C, 82.0; H, 8.1. Found (percent): C, 81.9; H, 8.1.

EXAMPLE 4

3.2 g. of 2,3,6-trichlorobenzyl alcohol and 3 cc. of pyridine were dissolved in 30 cc. of dry benzene, and the solution was cooled with ice. This solution was charged with a solution of 2.6 g. of 2,2,3,3-tetramethylcyclopropane-1-carboxylic acid chloride in 7 cc. of benzene. The mixed liquid was thoroughly shaken, was sealed in a container and was allowed to stand overnight at room temperature. This reaction liquid was washed successively with 5% hydrochloric acid, 5% aqueous sodium carbonate solution and saturated sodium chloride water. Thereafter, the liquid was dried with anhydrous sodium sulfate, and then the solvent was removed by distillation. The residue was purified according to column chromatography using alumina to obtain 4.4 g. of viscous, oily 2,3,6-trichlorobenzyl 2,2,3,3 - tetramethylcyclopropane - 1 - carboxylate. This carboxylate crystallized when allowed to stand and showed a melting point of 70°–72° C.

Elementary analysis.—Calculated for $C_{15}H_{17}Cl_3O_2$ (percent): C, 53.7; H, 5.1; Cl, 31.7. Found (percent): C, 53.5; H, 5.2; Cl, 31.3.

EXAMPLE 5

1.9 g. of 5-benzyl-3-furylmethyl alcohol and 1.8 g. of 2,2,3,3-tetramethylcyclopropane-1-carboxylic acid chloride were treated in the same manner as in Example 3 to obtain 3.0 g. of 5-benzyl-3-furylmethyl 2,2,3,3-tetramethylcyclopropane-1-carboxylate, $n_D^{31}$ 1.5186.

Elementary analysis.—Calculated for $C_{20}H_{24}O_3$ (percent): C, 76.9; H, 7.7. Found (percent): C, 76.9; H, 7.8.

EXAMPLE 6

1.6 g. of 4,5-benzo-2-furfuryl alcohol and 1.7 g. of 2,2,3,3-tetramethylcyclopropane-1-carboxylic acid chloride were treated in the same manner as in Example 3 to obtain 2.5 g. of 4,5-benzo-2-furfuryl 2,2,3,3-tetramethylcyclopropane-1-carboxylate, $n_D^{31}$ 1.5304.

Elementary analysis.—Calculated for $C_{17}H_{20}O_3$ (percent): C, 75.0; H, 7.4. Found (percent): C, 74.7; H, 7.4.

EXAMPLE 7

1.5 g. of 4-allylbenzyl alcohol and 1.6 g. of 2,2,3,3-tetramethylcyclopropanecarboxylic acid chloride were treated in the same manner as in Example 2 to obtain 2.5 g. of 4-allylbenzyl 2,2,3,3-tetramethylcyclopropane-1-carboxylate, $n_D^{31}$ 1.5055.

Elementary analysis.—Calculated for $C_{18}H_{24}O_2$ (percent): C, 79.4; H, 8.9. Found (percent): C, 79.6; H, 9.0.

EXAMPLE 8

2.1 g. of 4-(4'-methylbenzyl)-benzyl alcohol and 1.6 g. of 2,2,3,3-tetramethylcyclopropane-1-carboxylic acid chloride were treated in the same manner as in Example 3 to obtain 3.1 g. of 4-(4'-methylbenzyl)-benzyl 2,2,3,3-tetramethylcyclopropane-1-carboxylate, $n_D^{31}$ 1.5351.

Elementary analysis.—Calculated for $C_{23}H_{28}O_2$ (percent): C, 82.1; H, 8.4. Found (percent): C, 82.0; H, 8.4.

EXAMPLE 9

1.8 g. of 2,6-dimethyl-4-allylbenzyl alcohol and 1.6 g. of 2,2,3,3-tetramethylcyclopropane-1-carboxylic acid chloride were treated in the same manner as in Example 2 to obtain 2.7 g. of 2,6-dimethyl-4-allylbenzyl 2,2,3,3-tetramethylcyclopropane-1-carboxylate, $n_D^{31}$ 1.5101.

Elementary analysis.—Calculated for $C_{20}H_{28}O_2$ (percent): C, 80.0; H, 9.4. Found (percent): C, 80.4; H, 9.7.

EXAMPLE 10

1.6 g. of 4-(2'-methallyl)-benzyl alcohol and 1.6 g. of 2,2,3,3-tetramethylcyclopropane-1-carboxylic acid chloride were treated in the same manner as in Example 2 to obtain 2.5 g. of 4-(2'-methallyl)-benzyl 2,2,3,3-tetramethylcyclopropane-1-carboxylate, $n_D^{31}$ 1.5040.

Elementary analysis.—Calclauted for $C_{19}H_{26}O_2$ percent): C, 79.7; H, 9.1. Found (percent): C, 79.8; H, 9.4.

EXAMPLE 11

1.8 g. of 2,5-dimethyl-4-allylbenzyl alcohol and 1.6 g. of 2,2,3,3-tetramethylcyclopropane-1-carboxylic acid chloride were treated in the same manner as in Example 2 to obtain 2.8 g. of 2,5-dimethyl-4-allylbenzyl 2,2,3,3-tetramethylcyclopropane-1-carboxylate, $n_D^{31}$ 1.5110.

Elementary analysis.—Calculated for $C_{20}H_{28}O_2$ (percent): C, 80.0; H, 9.4. Found (percent): C, 80.1; H, 9.4.

EXAMPLE 12

1.7 g. of 3-methyl-2-furfuryl alcohol and 2.4 g. of 2,2,3,-tetramethylcyclopropane-1-carboxylic acid chloride were treated in the same manner as in Example 3 to obtain 3.1 g. of 3-methyl-2-furfuryl 2,2,3,3-tetramethylcyclopropane-1-carboxylate, $n_D^{31}$ 1.4814.

Elementary analysis.—Calculated for $C_{14}H_{20}O_3$ (percent): C, 71.2; H, 8.5. Found (percent): C, 70.8; H, 8.7.

EXAMPLE 13

2.0 g. of 2-methyl-4-benzyl-3-furylmethyl alcohol and 1.6 g. of 2,2,3,3-tetramethylcyclopropane-1-carboxylic acid chloride were treated in the same manner as in Example 2 to obtain 3.1 g. of 2-methyl-4-benzyl-3-furylmethyl 2,2,3,3 - tetramethylcyclopropane - 1 - carboxylate, $n_D^{31}$ 1.5178.

Elementary analysis.—Calculated for $C_{21}H_{26}O_3$ (percent): C, 77.3; H, 8.0. Found (percent): C, 77.4; H, 8.2.

EXAMPLE 14

1.5 g. of 4-allylbenzyl alcohol and 2.3 g. of (±)-cis·trans - 2,3,3 - trimethyl - 2 - phenylcyclopropane-1-carboxylic acid chloride were treated in the same manner as in Example 2 to obtain 2.9 g. of 4-allylbenzyl (±)-cis·trans-2,3,3-trimethyl-2 - phenylcyclopropane - 1 - carboxylate, $n_D^{31}$ 1.5432.

Elementary analysis.—Calculated for $C_{23}H_{26}O_2$ (percent): C, 82.6; H, 7.8. Found (percent): C, 82.8; H, 8.1.

EXAMPLE 15

1.6 g. of 3,4-tetramethylenebenzyl alcohol and 2.3 g. of (±)-cis·trans-2,2,3-trimethyl - 2 - phenylcyclopropane-1-carboxylic acid chloride were treated in the same manner as in Example 2 obtain 3.1 g. of 3,4-tetramethylenebenzyl (±)-cis·trans-2,3,3-trimethyl-2-phenylcyclopropane-1-carboxylate, $n_D^{31}$ 1.5593.

Elementary analysis.—Calculated for $C_{24}H_{28}O_2$ (percent): C, 82.7; H, 8.1. Found (percent)): C, 82.7; H, 8.0.

EXAMPLE 16

1.6 g. of 3,4-tetramethylenebenzyl alcohol and 1.6 g. of (±)-cis·trans-2,2,3-trimethylcyclopropane - 1 - carboxylic acid chloride were treated in the same manner as in Example 2 to obtain 2.5 g. of 3,4-tetramethylenebenzyl (±) - cis trans - 2,3,3-trimethyl-2-phenylcyclopropane-1-carboxylate, $n_D^{31}$ 1.5593.

Elementary analysis.—Calculated for $C_{18}H_{24}O_2$ (percent): C, 79.4; H, 8.9. Found (percent): C, 79.5; H, 9.0.

EXAMPLE 17

1.6 g. of 3,4-tetramethylenebenzyl alcohol and 1.7 g. of (±) - cis·trans-2,2,3-trimethyl-3-ethylcyclopropane-1-carboxylic acid chloride were treated in the same manner as in Example 2 to obtain 2.7 g. of 3,4-tetramethylenebenzyl (±)-cis·trans - 2,2,3 - trimethyl - 3-ethylcyclopropane carboxylate, $n_D^{31}$ 1.5190.

Elementary analysis.—Calculated for $C_{20}H_{28}O_2$ (percent): C, 80.0; H, 9.4. Found (percent): C, 80.0; H, 9.3.

EXAMPLE 18

1.9 g. of 2-benzyl-4-furfuryl alcohol and 1.8 g. of (±)-cis·trans - 2,2,3 - trimethyl - 3 - ethylcyclopropane-1-carboxylic acid chloride were treated in the same manner as in Example 3 to obtain 3.0 g. of 5-benzyl-3-furylmethyl (±)-cis·trans - 2,2,3 - trimethyl-3-ethylcyclopropane-1-carboxylate, $n_D^{31}$ 1.5162.

Elementary analysis.—Calculated for $C_{21}H_{26}O_3$ (percent): C, 77.3; H, 8.0. Found (percent): C, 77.1; H, 8.1.

EXAMPLE 19

1.6 g. of 3,4-tetramethylenebenzyl alcohol and 2.4 g. of (±) - cis·trans - 2,3,3 - trimethyl-3-(4'-methylphenyl)-cyclopropane-1-carboxylic acid chloride were treated in the same manner as in Example 2 to obtain 3.3 g. of 3,4-tetramethylenebenzyl (±)-cis·trans - 2,2,3 - trimethyl-3-(4'-methylphenyl)-cyclopropane - 1 - carboxylate, $n_D^{31}$ 1.5582.

Elementary analysis.—Calculated for $C_{25}H_{30}O_2$ (percent): C, 82.8; H, 8.3. Found (percent): C, 83.0; H, 8.3.

EXAMPLE 20

2.5 g. of 2,4,6-trimethylbenzyl chloride and 2.5 g. of sodium - 2,2,3,3-tetramethylcyclopropane-1-carboxylate were treated in the same manner as in Example 1 to obtain 3.5 g. of 2,4,6-trimethylbenzyl 2,2,3,3-tetramethylcyclopropane-1-carboxylate, $n_D^{32}$ 1.5070.

Elementary analysis.—Calculated for $C_{18}H_{26}O_2$ (percent): C, 78.8; H, 9.6. Found (percent): C, 78.6; H, 9.3.

EXAMPLE 21

2.4 g. of tetramethylenebenzyl alcohol and 4.0 g. of 2,2,3,3 - tetramethylcyclopropane-1-carboxylic anhydride were dissolved in 30 cc. of toluene, and the solution was heated and refluxed for 4 hours. After cooling, the reaction liquid was washed successively with 5% aqueous sodium carbonate solution and saturated sodium chloride water. The liquid was dried with anhydrous magnesium sulfate, and the toluene was removed by distillation. The residue was purified according to column chromatography using alumina to obtain 3.8 g. of 3,4-tetramethylenebenzyl 2,2,3,3-tetramethylcyclopropane-1-carboxylate.

EXAMPLE 22

1.9 g. of 5-benzyl-3-furylmethyl alcohol and 1.5 g. of 2,2,3,3-tetramethylcyclopropane-1-carboxylic acid were dissolved in 40 ml. of methylene dichloride. The solution was charged with 3 g. of dicyclohexyl carbodiimide and was allowed to stand for 24 hours at room temperature. The deposited dicyclohexylurea was separated by filtration and was washed successively with 5% aqueous sodium carbonate solution and saturated sodium chloride water. After drying the liquid with anhydrous magnesium sulfate, the solvent was removed by reduced pressure distillation. The residue was purified according to column chromatography using silica gel to obtain 2.8 g. of 5-benzyl-3-furylmethyl 2,2,3,3-tetramethylcyclopropane-1-carboxylate.

EXAMPLE 23

1.4 g. of 5-allyl-2-furfuryl alcohol and 2.0 g. of 2,2,3,3-tetramethylcyclopropane-1-carboxylic acid chloride were treated in the same manner as in Example 2 to obtain 2.0 g. of 5-allyl-2-furfuryl 2,2,3,3-tetramethylcyclopropane-1-carboxylate, $n_D^{31}$ 1.4880.

Elementary analysis.—Calculated for $C_{16}H_{22}O_3$ (percent): C, 73.3; H, 8.4. Found (percent): C, 73.0; H, 8.3.

EXAMPLE 24

1.4 g. of 5-allyl-3-furylmethyl alcohol and 2.0 g. of 2,2,3,3-tetramethylcyclopropane-1-carboxylic acid chloride were treated in the same manner as in Example 2 to obtain 1.9 g. of 5-allyl-3-furylmethyl 2,2,3,3-tetramethyl-cyclopropane-1-carboxylate, $n_D^{31}$ 1.4835.

Elementary analysis.—Calculated for $C_{16}H_{22}O_3$ (percent): C, 73.3; H, 8.4. Found (percent): C, 73.1; H, 8.5.

EXAMPLE 25

1.7 g. of 4-(2'-furfuryl)-benzyl alcohol and 1.6 g. of 2,2,3,3-tetramethylcyclopropane-1-carboxylic acid chloride were treated in the same manner as in Example 2 to obtain 2.6 g. of 4-(2'-furfuryl)-benzyl 2,2,3,3-tetramethylcyclopropane-1-carboxylate, $n_D^{32}$ 1.5189.

Elementary analysis.—Calculated for $C_{19}H_{22}O_3$ (percent): C, 76.5; H, 7.4. Found (percent): C, 76.6; H, 7.6.

The following experimental examples show the insecticidal effects of the compounds prepared in accordance with the present invention.

EXPERIMENTAL EXAMPLE 1

The present compounds were individually dissolved in kerosene to obtain oil preparations having test concentrations. 5 ml. of each oil formulation was sprayed in 10 seconds using Campbell's turn table apparatus ["Soap and Sanitary Chemicals," vol. 14, No. 6, page 119 (1938)]. After 20 seconds, the shutter was opened, and housefly adults (a group of about 100 houseflies) were exposed to the spray for 10 minutes and were then transferred to an observation gauge. At this time, the number of knocked down houseflies was observed and, one day after, the life and death of the houseflies were observed to calculate the knocked down ratio and lethal ratio of the houseflies. The results were as follows:

INSECTICIDAL EFFECTS OF THE PRESENT COMPOUNDS ON HOUSEFLY ADULTS

| Compound No.: | Concentration of active ingredient (percent) | Knocked down ratio after 10 minutes (percent) | Lethal ratio after 1 day (percent) |
| --- | --- | --- | --- |
| (1) | 0.2 | 0 | 53 |
| (2) | 0.5 | 0 | 89 |
| (3) | 0.5 | 0 | 75 |
| (4) | 0.2 | 30 | 86 |
| (5) | 0.05 | 100 | 100 |
| (6) | 0.5 | 0 | 43 |
| (7) | 0.2 | 0 | 100 |
| (8) | 0.5 | 0 | 77 |
| (9) | 0.2 | 0 | 100 |
| (10) | 0.5 | 0 | 94 |
| (11) | 0.5 | 0 | 100 |
| (12) | 0.5 | 0 | 75 |
| (13) | 0.2 | 50 | 92 |
| (14) | 0.2 | 0 | 95 |
| (15) | 0.5 | 0 | 80 |
| (16) | 1.0 | 0 | 78 |
| (17) | 0.5 | 0 | 51 |
| (18) | 0.1 | 100 | 100 |
| (19) | 0.5 | 0 | 77 |
| (20) | 0.5 | 0 | 42 |
| (21) | 0.5 | 0 | 85 |
| (22) | 0.2 | 100 | 100 |
| (23) | 0.1 | 50 | 92 |
| (24) | 0.15 | 80 | 98 |
| (25) | 0.05 | 80 | 95 |
| (26) | 0.1 | 100 | 100 |
| (27) | 0.5 | 0 | 65 |
| (28) | 0.2 | 100 | 100 |
| (29) | 0.2 | 100 | 98 |
| (30) | 0.5 | 0 | 47 |
| (31) | 0.5 | 70 | 72 |
| (32) | 0.2 | 0 | 90 |
| (33) | 0.5 | 0 | 100 |
| (34) | 0.5 | 0 | 55 |
| (35) | 0.2 | 100 | 100 |
| (36) | 0.2 | 100 | 100 |
| (37) | 0.2 | 100 | 100 |
| (38) | 0.5 | 0 | 60 |
| Pyrethrin | 0.2 | 100 | 90 |
| Allethrin | 0.2 | 100 | 65 |
| 3,4,5,6-tetrahydrophthalimidomethyl chrysanthemate [1] | 0.2 | 100 | 85 |

[1] Hereinafter referred to as "phthalthrin."

EXPERIMENTAL EXAMPLE 2

The present compounds (4), (5), (7) and (9) and chrysanthemum-monocarboxylates corresponding thereto, i.e., 2,3,6 - trichlorobenzyl chrysanthemate, 5 - benzyl-3-furylmethyl chrysanthemate, 4-allylbenzyl chrysanthemate and 2,6-dimethyl-4-allylbenzyl chrysanthemate, were formed into oil formulations, respectively. The thus prepared oil formulations were applied to houseflies in the same manner as in Experimental Example 1, using Campbell's turn table apparatus, to calculate the lethal ratios of houseflies at 3 test concentrations of individual compounds. Based on the result obtained, the insecticidal effects of individual compounds on the houseflies were calculated and represented by $LC_{50}$ (50% lethal concentrations) to obtain the values as shown below.

Insecticidal effects on housefly adults:

| Compound | $LC_{50}$ (percent) | Effective ratio |
|---|---|---|
| Present compound (4) | 0.085 | 1.5 |
| 2,3,6-trichlorobenzyl chrysanthemate | 0.12 | 1.0 |
| Present compound (5) | 0.0035 | 1.4 |
| 5-benzyl-3-furylmethyl chrysanthemate | 0.005 | 1.0 |
| Present compound (7) | 0.043 | 1.3 |
| 4-allylbenzyl chrysanthemate | 0.055 | 1.0 |
| Present compound (9) | 0.029 | 1.3 |
| 2,6-dimethyl-4-allylbenzyl chrysanthemate | 0.037 | 1.0 |

EXPERIMENTAL EXAMPLE 3

The present compound (5) and a chrysanthemum-monocarboxylate corresponding thereto, i.e. 5-benzyl-3-furylmethyl chrysanthemate, were individually dissolved in deodorized kerosene to prepare 0.2% oil formulations. About 20 housefly adults were released in a glass chamber (70 x 70 x 70 cm.), and 0.7 ml. of each of the above formulations was uniformly sprayed in said chamber under a pressure of 20 pounds by means of a glass-made atomizer. Thereafter, the number of knocked down houseflies was observed with time to obtain the results as shown below.

| | 38" | 53" | 1'15" | 1'45" | 2'30" | 3'30" | 5' | 7' | 10' | $KT_{50}$* (sec.) |
|---|---|---|---|---|---|---|---|---|---|---|
| Present compound (5) | 3.0 | 7.0 | 16.9 | 35.7 | 71.3 | 86.2 | 93.1 | 94.1 | 100 | 120 |
| 5-benzyl-3-furylmethyl chrysanthemate | 0 | 1.0 | 4.0 | 10.0 | 32.0 | 63.0 | 79.0 | 93.0 | 99.0 | 190 |

*$KT_{50}$ signifies 50% knocked down time.

The modes of preparation of the present compositions will be illustrated in detail below with reference to examples and the effects of several compositions obtained in the examples will be shown by way of test examples, but it is needless to say that the scope of the present invention is not limited to the examples. All parts are by weight.

EXAMPLE 1

0.4 part of the compound (1) is dissolved in kerosene to make 100 parts, whereby a 0.4% oil preparation is obtained.

EXAMPLE 2

0.4 part of the compound (2) is dissolved in kerosene to make 100 parts, whereby a 0.4% oil preparation is obtained.

EXAMPLE 3

10 parts of the compound (2), 10 parts of Sorpol SM-200 (registered trade name of a product of Toho Kagaku K.K.) and 80 parts of xylene are mixed and dissolved with stirring to obtain an emulsifiable concentrate.

EXAMPLE 4

5 parts of the compound (2), 5 parts of Sumithion®, 20 parts of Sorpol SM-200 (same as mentioned above) and 70 parts of xylene are mixed and dissolved with stirring to obtain an emulsifiable concentrate.

EXAMPLE 5

0.3 part of the compound (3) and 1.5 parts of piperonyl butoxide are dissolved in kerosene to make 100 parts, whereby an oil preparation is obtained.

EXAMPLE 6

10 parts of the compound (4), 20 parts of Sorpol 2020 (registered trade name of a product of Toho Kagaku K.K.) and 70 parts of xylene are mixed and dissolved with stirring to obtain an emulsifiable concentrate.

EXAMPLE 7

0.2 part of the compound (4) and 0.5 part of Sumithion® are dissolved in kerosene to make 100 parts, whereby an oil preparation is obtained.

EXAMPLE 8

0.1 part of the compound (5) is dissolved in kerosene to make 100 parts, whereby a 0.1% oil preparation is obtained.

EXAMPLE 9

0.4 part of the compound (5), 6 parts of xylene and 8.6 parts of deodorized kerosene are mixed and dissolved, and the solution is charged in an aerosol container. After attaching a valve portion to the container, 85 parts of a propellant (e.g. Freon, vinyl chloride monomer or liquefied petroleum gas) is charged under pressure through said valve portion into the container to obtain an aerosol.

EXAMPLE 10

0.6 g. of the compound (5) is dissolved in 20 ml. of methanol, and the solution is homogeneously stirred and mixed with 99.4 g. of a mosquito coil carrier (a 5:3:1 mixture of tabu-powder, pyrethrum marc and wood powder). After vaporizing the methanol, the mixture is thoroughly kneaded with 150 ml. of water and is then shaped and dried to obtain a mosquito coil.

EXAMPLE 11

1 part of the compound (5) is dissolved in 20 parts of acetone. The solution is mixed with 99 parts of 300 mesh diatomaceous earth, and the mixture is thoroughly stirred in a mortar. Thereafter, the acetone is removed by vaporization to obtain a dust preparation.

EXAMPLE 12

10 parts of the compound (5), 10 parts of Sorpol SM-200 (same as mentioned before), and 80 parts of xylene are mixed and dissolved with stirring to obtain an emulsifiable concentrate.

EXAMPLE 13

0.02 part of the compound (5) and 0.15 part of natural pyrethrin are dissolved in kerosene to make 100 parts, whereby an oil preparation is obtained.

EXAMPLE 14

0.02 part of the compound (2) and 0.2 part of phthalthrin are dissolved in kerosene to make 100 parts, whereby an oil preparation is obtained.

EXAMPLE 15

0.04 part of the compound (5), 0.36 part of phthalthrin, 6 parts of xylene and 8.6 parts of deodorized kerosene are mixed and dissolved, and the solution is charged in an aerosol container. After attaching a valve portion to the container, 85 parts of a propellant (e.g. Freon, vinyl chloride monomer or liquefied petroleum gas) is charged under pressure through said valve portion into the container to obtain an aerosol.

EXAMPLE 16

0.1 part of the compound (5) and 0.5 part of piperonyl butoxide are dissolved in kerosene to make 100 parts, whereby an oil preparation is obtained.

EXAMPLE 17

0.4 part of the compound (5), 13.6 parts of deodorized kerosene and 1 part of Atmos 300 (registered trade name of an emulsifier produced by Atlas Chemical Corp.), and the mixture is emulsified by addition of 50 parts of pure water. Thereafter, the emulsified mixture is charged in an aerosol container together with 35 parts of a 3:1 mixture of deodorized butane and deodorized propane to obtain a water-based aerosol.

EXAMPLE 18

0.2 g. of the compound (5) is dissolved in a suitable amount of chloroform. The solution is uniformly adsorbed on the surface of 0.3 cm. thick asbestos of 2.5 cm. x 1.5 cm. Onto the thus treated asbestos, an asbestos sheet of the same size is applied to obtain a fibrous fumigant insecticidal composition to be used on an electrically heated plate. As the fibrous support, there may be used, in addition to asbestos, a pulp sheet or the like material which is same in effectiveness as asbestos.

EXAMPLE 19

5 parts of the compound (5), 5 parts of Toyolignin CT (registered trade name of a product of Toyo Boseki K.K.) and 90 parts of GSM Clay (registered trade name of a product of Ziekleit Kogyo K.K.) are thoroughly mixed with stirring in a mortar. The mixture is charged with 10% based on the mixture of water, and is further stirred. Subsequently, the mixture is granulated by means of a granulator and is then air-dried to obtain a granule.

EXAMPLE 20

0.2 part of the compound (7) is dissolved in kerosene to make 100 parts, whereby a 0.2% oil preparation is obtained.

EXAMPLE 21

1 g. of the compound (7) is dissolved in 20 ml. of methanol. The solution is homogeneously stirred and mixed with 99 g. of a mosquito coil carrier (a 5:3:1 mixture of tabu-powder, pyrethrum marc and wood powder). After vaporizing the methanol, the mixture is thoroughly kneaded with 150 ml. of water and is then shaped and dried to obtain a mosquito coil.

EXAMPLE 22

5 parts of the compound (7), 5 parts of BHC, 20 parts of Sorpol 2020 (same as mentioned before) and 10 parts of xylene are mixed and dissolved with stirring to obtain an emulsifiable concentrate.

EXAMPLE 23

0.2 part of the compound (7) and 0.2 part of DDVP are dissolved in kerosene to make 100 parts, whereby an oil preparation is obtained.

EXAMPLE 24

0.2 part of the compound (9) is dissolved in kerosene to make 100 parts, whereby a 0.2% oil preparation is obtained.

EXAMPLE 25

10 parts of the compound (14), 20 parts of Sorpol 2020 (same as mentioned before) and 70 parts of xylene are mixed and dissolved with stirring to obtain an emulsifiable concentrate.

EXAMPLE 26

0.3 part of the compound (18) is dissolved in kerosene to make 100 parts, whereby an oil preparation is obtained.

EXAMPLE 27

0.2 part of the compound (22) is dissolved in kerosene to make 100 parts, whereby an oil preparation is obtained.

EXAMPLE 28

0.4 part of the compound (23) is dissolved in kerosene to make 100 parts, whereby an oil preparation is obtained.

EXAMPLE 29

0.5 g. of the compound (24) is dissolved in 20 ml. of methanol. The solution is added with 99.5 g. of a mosquito coil carrier (a 5:3:1 mixture of tabu-powder, pyrethrum marc and wood powder) and the mixture is thoroughly mixed with stirring. After vaporizing the methanol, the mixture is thoroughly kneaded with 150 ml. of water and is then moulded and dried to obtain a mosquito coil.

EXAMPLE 30

15 parts of the compound (25), 10 parts of Sorpol SM–200 and 75 parts of xylene are mixed and dissolved to obtain an emulsifiable concentrate.

EXAMPLE 31

20 parts of the compound (26), and 5 parts of Sorpol SM–200 is thoroughly mixed and the mixture is added with 75 parts of 300 mesh talc and well kneaded in a mortar to obtain a wettable powder.

EXAMPLE 32

0.2 part of the compound (28) is dissolved in kerosene to make 100 parts, whereby an oil preparation is obtained.

EXAMPLE 33

0.5 part of the compound (31) is dissolved in kerosene to make 100 parts, whereby an oil preparation is obtained.

EXAMPLE 34

20 parts of the compound (31), 20 parts of Sorpol SM–200 (same as mentioned before) and 60 parts of xylene are mixed and dissolved with stirring to obtain an emulsifiable concentrate.

EXAMPLE 35

0.3 part of the compound (33) and 1.5 parts of piperonyl butoxide are dissolved in kerosene to make 100 parts, whereby an oil preparation is obtained.

EXAMPLE 36

0.2 part of the compound (35) is dissolved in kerosene to make 100 parts, whereby an oil preparation is obtained.

EXAMPLE 37

5 parts of the compound (37), 20 parts of Sorpol 2020 (same as mentioned before) and 75 parts of xylene are mixed and dissolved with stirring to obtain an emulsifiable concentration.

EXAMPLE 38

0.5 part of the compound (27) is dissolved in kerosene to make 100 parts, whereby an oil preparation is obtained.

EXAMPLE 39

25 parts of the compound (36) and 5 parts of Sorpol SM–200 (same as mentioned before) are thoroughly mixed. The mixture is charged with 70 parts of 300 mesh talc and the resulting mixture is sufficiently stirred in a mortar to obtain a wettable powder.

EXAMPLE 40

Each 0.5 part of the compound Nos. (6), (7), (12), (16), (19), (26) and (34) is respectively added with 2 parts of piperonyl butoxide and each mixture is dissolved in refined kerosene to make 100 parts, whereby each oil preparation is obtained.

EXAMPLE 41

Each 25 parts of the compound Nos. (10), (11), (13), (15), (17), (20), (21), (25), (28) and (30) are respectively added with 15 parts of Sorpol SM–200 and 60 parts of xylene and dissolved with stirring to obtain each emulsifiable concentrate.

The insecticidal effects of several formulations among the present compositions obtained in the above manner are as shown in the following test examples:

TEST EXAMPLE 1

About 20 northern house mosquito adults were released in a glass chamber (70 x 70 x 70 cm.). 1 g. of each of the mosquito coils obtained according to Examples 10, 21 and 29 was burnt on both ends and was placed at the center inside the glass chamber. Thereafter, the number of knocked down mosquito adults was observed with time to calculate the KT 50 (50% knocked down time). The results were as shown in Table 1.

TABLE 1

| Insecticidal composition: | KT 50 (time) |
|---|---|
| Mosquito coil of Example 10 | 12′00″ |
| Mosquito coil of Example 21 | 13′30″ |
| Mosquito coil of Example 29 | 15′00″ |
| 0.5% allethrin mosquito coil | 11′30″ |

TEST EXAMPLE 2

About 20 northern house mosquito adults were released in a glass chamber (70 x 70 x 70 cm.). 0.7 ml. of each of the oil preparations obtained according to Examples 8, 26, 28 and 36 was uniformly sprayed in the chamber under a pressure of 20 pounds by means of a glass-made atomizer.

Thereafter, the number of knocked down mosquito adults was observed with time to calculate the KT 50 (same as mentioned above). The results were as shown in Table 2.

TABLE 2

| Insecticidal composition: | KT 50 (sec.) |
|---|---|
| Oil preparation of Example 8 | 280″ |
| Oil preparation of Example 26 | 260″ |
| Oil preparation of Example 28 | 220″ |
| Oil preparation of Example 36 | 300″ |
| 0.2% allethrin oil formulation | 145″ |

TEST EXAMPLE 3

The insecticidal effects on housefly adults of the aerosols obtained in accordance with Examples 9, 15 and 17 were tested according to aerosol test method using a Peet-Grady chamber [which method is set forth in Soap and Chemical Specialties Blue Book (1965)]. The results were as shown in Table 3.

TABLE 3

| Insecticidal composition | Sprayed amount (mg./(6 ft.)$^3$) | Knock-down (percent) | | | Knock-down mortality (percent) |
|---|---|---|---|---|---|
| | | 5 min. | 10 min. | 15 min. | |
| Aerosol of Example 9 | 650 | 3.0 | 27.0 | 80.0 | 80.0 |
| Aerosol of Example 15 | 650 | 9.2 | 44.9 | 75.6 | 63.3 |
| Aerosol of Example 17 [1] | 625 | 6.7 | 40.7 | 82.0 | 82.0 |
| OTA | 650 | 20.7 | 41.3 | 75.0 | 43.7 |

[1] Water base.

TEST EXAMPLE 4

The emulsifiable concentrate or wettable powder obtained according to Examples 4, 6, 12, 22, 25, 30, 31, 34 and 37 were individually adjusted with water to a test concentration. 200 ml. of each of the thus treated formulation was charged in a 300 ml. glass beaker. Into the beaker, about 30 full grown larvae of northern house mosquitoes were released. After one day, the life and death of said larvae were observed to calculate the LC$_{50}$ (50% lethal concentration). The results were as shown in Table 4.

TABLE 4

| Insecticidal composition: | LC$_{50}$ (p.p.m.) [1] |
|---|---|
| Emulsifiable concentrate of Example 4 | 0.012 |
| Emulsifiable concentrate of Example 6 | 0.008 |
| Emulsifiable concentrate of Example 12 | 0.012 |
| Emulsifiable concentrate of Example 22 | 0.08 |
| Emulsifiable concentrate of Example 25 | 0.16 |
| Emulsifiable concentrate of Example 30 | 0.18 |
| Wettable powder of Example 31 | 0.12 |
| Emulsifiable concentrate of Example 34 | 0.02 |
| Emulsifiable concentrate of Example 37 | 0.20 |
| Sumithion emulsion formulation | 0.01 |
| Allethrin emulsion formulation | 0.105 |

[1] Concentration of effective insecticidal active ingredient.

TEST EXAMPLE 5

Each of the oil preparation obtained according to Examples 7, 13, 14 and 23 was sprayed onto the surface of a plywood in a proportion of 50 ml./m.$^2$, and was air-dried. On the plywood was placed a 10 cm.-diameter glass ring coated on the inner surface with butter, and 10 German cockroach adults were released in said glass ring. After continuous contact for 24 hours, the number of knocked down insects (including killed insects) was observed to obtain the results as set forth in Table 5.

TABLE 5

| Insecticidal composition: | Knock-down (percent) |
|---|---|
| Oil preparation of Example 7 | 100 |
| Oil preparaiton of Example 13 | 100 |
| Oil preparation of Example 14 | 90 |
| Oil preparation of Example 23 | 100 |

TEST EXAMPLE 6

In a 1/50,000 Wagner pot were grown rice plants which had elapsed 45 days after seeding. To the rice plants, the dust formulation obtained according to Example 11 was sprinkled in a proportion of 300 mg./pot by means of a bell jar duster. Subsequently, the plants were covered with a wire net and 30 green rice leafhopper adults were released in the wire net. After 24 hours, the life and death of the insects were observed to obtain the results as shown in Table 6.

TABLE 6

| Insecticidal composition: | Kill (percent) |
|---|---|
| Dust preparation of Example 11 | 100 |
| 1.5% malathion dust preparation | 100 |

TEST EXAMPLE 7

In a 1/50,000 Wagner pot were grown rice plants which had elapsed 45 days after seeding. The emulsifiable concentrate obtained according to Examples 4, 6, 12, 25 and 34 were individually diluted to a test concentration, and each test liquid was sprayed to the rice plants in a proportion of 10 ml./pot. The plants were covered with a wire net and 30 green rice leafhopper adults were released in the wire net. After 24 hours, the life and death of the insects were observed to obtain the results as set forth in Table 7.

TABLE 7

| Insecticidal composition: | Kill (percent) |
|---|---|
| 400 times diluted liquid of emulsifiable of Example 4 | 100 |
| 400 times diluted liquid of emulsifiable of Example 6 | 90 |
| 400 times diluted liquid of emulsifiable of Exple 12 | 100 |
| 400 times diluted liquid of emulsifiable of Example 25 | 100 |
| 800 times diluted liquid of emulsifiable of Example 34 | 100 |
| 2000 times diluted liquid of 50% malathion emulsion formulation | 100 |

What is claimed is:
1. A cyclopropanecarboxylic acid ester of the formula,

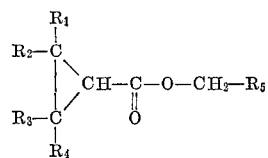

wherein $R_1$ is a hydrogen atom, methyl, ethyl or phenyl; $R_2$, $R_3$ and $R_4$ are individually methyl or ethyl; $R_5$ is a phenyl, furyl, benzofuryl, methyl substituted benzofuryl or phenyl and furyl having one to three substituents selected from the group consisting of methyl, a halogen atom, allyl, trimethylene, tetramethylene, benzyl, methyl substituted benzyl, thenyl or furfuryl.

2. The ester of claim 1 wherein $R_1$, $R_2$, $R_3$ and $R_4$ are each methyl.

3. The ester of claim 1 which is 4-benzylbenzyl 2,2,3,3-tetramethylcyclopropane-1-carboxylate.

4. The ester of claim 1 which is 2,5-dimethyl-4-allylbenzyl 2,2,3,3-tetramethylcyclopropane-1-carboxylate.

5. The ester of claim 1 which is 4-allylbenzyl 2,3,3-trimethyl-2-phenylcyclopropane-1-carboxylate.

6. The ester of claim 1 which is 4-allylbenzyl 2,2,3,3-tetramethylcyclopropane-1-carboxylate.

7. The ester of claim 1 which is 3,4-tetramethylenebenzyl 2,3,3 - trimethyl-2-phenylcyclopropane-1-carboxylate.

8. The ester of claim 1 which is 5-benzyl-3-furylmethyl 2,3,3-trimethyl-2-phenylcyclopropane-1-carboxylate.

9. The ester of claim 1 wherein $R_2$, $R_3$, and $R_4$ are each methyl and $R_1$ is phenyl.

10. The ester of claim 1 wherein $R_2$, $R_3$ and $R_4$ are each methyl and $R_1$ is hydrogen.

11. The ester of claim 1 wherein $R_5$ is 5-benzyl-3-furyl.

12. The ester of claim 1 wherein $R_5$ is 4-allylphenyl.

13. The ester of claim 1 which is 5-benzyl-3-furylmethyl 2,2,3,3-tetramethylcyclopropane-1-carboxylate.

14. A cyclopropanecarboxylic acid ester of the formula,

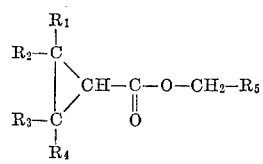

wherein $R_1$ is a hydrogen atom, methyl, ethyl or phenyl; $R_2$, $R_3$ and $R_4$ are individually methyl or ethyl; $R_5$ is a phenyl, furyl, benzofuryl, methyl substituted benzofuryl or phenyl and furyl having one to three substituents selected from the group consisting of methyl, a halogen atom, allyl, trimethylene, tetramethylene, wherein the trimethylene and tetramethylene groups have their terminal linkages attached to adjacent carbon atoms of the phenyl or furyl ring, benzyl, methyl substituted benzyl, thenyl or furfuryl.

References Cited

UNITED STATES PATENTS

| 3,414,607 | 12/1968 | Fujimoto et al. | 260—468 |
| 3,358,011 | 12/1967 | Elliott | 260—468 |
| 3,047,611 | 7/1962 | Moore et al. | 260—468 |

OTHER REFERENCES

Gersdorff et al., J. Eco. Entomol. 52: 521–4 (1959).
Fieser et al., Adv. Org. Chem. (Reinhold, New York, 1961), p. 721.

HENRY R. JILES, Primary Examiner

C. M. SHURKO, Assistant Examiner

U.S. Cl. X.R.

260—332.2, 346.2, 468, 469; 424—275, 278, 306